(12) United States Patent
Daniel et al.

(10) Patent No.: US 10,476,287 B2
(45) Date of Patent: Nov. 12, 2019

(54) BI-DIRECTIONAL PRECHARGE MECHANISM FOR CHARGER CIRCUITS

(71) Applicant: Intel IP Corporation, Santa Clara, CA (US)

(72) Inventors: Marcin Daniel, Munich (DE); Marian Hulub, Munich (DE)

(73) Assignee: Intel IP Corporation, Santa Clara, CA (US)

(*) Notice: Subject to any disclaimer, the term of this patent is extended or adjusted under 35 U.S.C. 154(b) by 315 days.

(21) Appl. No.: 15/199,744

(22) Filed: Jun. 30, 2016

(65) Prior Publication Data
US 2018/0006479 A1    Jan. 4, 2018

(51) Int. Cl.
H02J 7/00    (2006.01)

(52) U.S. Cl.
CPC .......... *H02J 7/0052* (2013.01); *H02J 7/0054* (2013.01); *H02J 2007/0059* (2013.01); *H02J 2007/0062* (2013.01)

(58) Field of Classification Search
CPC ..................................................... H02J 7/007
USPC ........................................................ 320/128
See application file for complete search history.

(56) References Cited

U.S. PATENT DOCUMENTS

| 2010/0277125 A1* | 11/2010 | Ferguson | H02J 7/0021 |
| | | | 320/128 |
| 2012/0083075 A1 | 4/2012 | Robb et al. | |
| 2012/0268075 A1* | 10/2012 | Wolf | G01R 19/0092 |
| | | | 320/132 |

FOREIGN PATENT DOCUMENTS

| EP | 2164149 | 3/2010 |
| WO | 2014116212 | 7/2014 |
| WO | 2018004898 | 1/2018 |

OTHER PUBLICATIONS

"International Application Serial No. PCT/US2017/034438, International Search Report dated Sep. 6, 2017", 3 pgs.
"International Application Serial No. PCT/US2017/034438, Written Opinion dated Sep. 6, 2017", 11 pgs.

* cited by examiner

*Primary Examiner* — Edward Tso
*Assistant Examiner* — Ahmed H Omar
(74) *Attorney, Agent, or Firm* — Schwegman Lundberg & Woessner, P.A.

(57) ABSTRACT

Some embodiments include apparatus and methods for using a first node to couple to a battery, a second node to couple to a terminal of an interface, and a precharge circuit unit coupled to the first and second nodes. The precharge circuit can operates to cause a first current to flow from the first node to the second node through a transistor of the precharge circuit unit based on first values of voltages at the first and second nodes, and to cause a second current to flow from the second node to the first node through the transistor based on second values of voltages at the first and second nodes.

18 Claims, 4 Drawing Sheets

BI-DIRECTIONAL PRECHARGE MECHANISM FOR CHARGER CIRCUITS

TECHNICAL FIELD

Embodiments described herein pertain to power management. Some embodiments relate to charging circuitry.

BACKGROUND

Many electronic devices (or systems) use power from a rechargeable battery. A charger is often used to recharge the battery based on power from an external power source. Many conventional chargers have circuitry to allow the battery to provide power to another device (e.g., a portable Universal Serial Bus (USB) device, a memory stick, or other devices) coupled to the electronic device or system that has the battery. Some conventional chargers may include two circuits that operate independently from each other to delivery charge uni-directionally. For example, in one mode of the charger, a first circuit of the two circuits is turned on to deliver charge in one direction from an external power source to the battery while a second circuit of the two circuits is turned off. In another mode of the charger, the second circuit is turned on to deliver charge in another direction from the battery to a port (where an external device is coupled) while the first circuit is turned off. Using two uni-directional charge delivery circuits in some conventional chargers may involve complex control and circuit area inefficiency.

DETAILED DESCRIPTION

The technique described herein includes a charger. The charger includes a precharge circuit unit and a DCDC converter unit. The precharge circuit unit can operate to provide (e.g., deliver) charge bi-directionally. The DCDC converter unit can be configured to operate as a DCDC buck converter during one mode (e.g., charge mode) of the charger in order to charge a battery, and to operate as a DCDC buck converter during another mode (e.g., supply mode) of the charger in order to supply charge to an external device. The precharge circuit unit can operate as a bi-directional current source to provide controlled current in different directions during different modes (e.g., charge mode and supply mode) of the charger.

In an initial phase of the operation of the charger in each of the modes, the precharge circuit unit can provide charge either from an external power source to the battery (in charge mode) or from the battery to an external device (in the supply mode). In the initial phase, the precharge circuit unit can bypass the DCDC converter unit to deliver charge without the involvement of the DCDC converter circuit. This may improve the efficiency of the DCDC converter (e.g., power loss associated with DCDC converter unit during the initial phase may be avoided).

Using the precharge circuit unit to provide charge (to either the battery or to an external device) during the initial phase of the operation may also help protect components (e.g., output stage devices) of the DCDC converter circuit from stress conditions. For example, in the operation of the charger, the DCDC converter circuit can be enabled (e.g., activated) to continue the operation after the initial phase when the precharge circuit unit completes the precharge stage of the operation. Thus, by the time the DCDC converter unit is enabled, a voltage difference across the DCDC converter unit can be relatively small. This small voltage difference may help protect components of the DCDC converter circuit from stress conditions.

Using the precharge circuit unit in the technique described herein may also reduce control complexity and circuit area in comparison with some conventional chargers. Other improvements and benefits associated with the described charger and its components are also discussed below.

Figure 1:
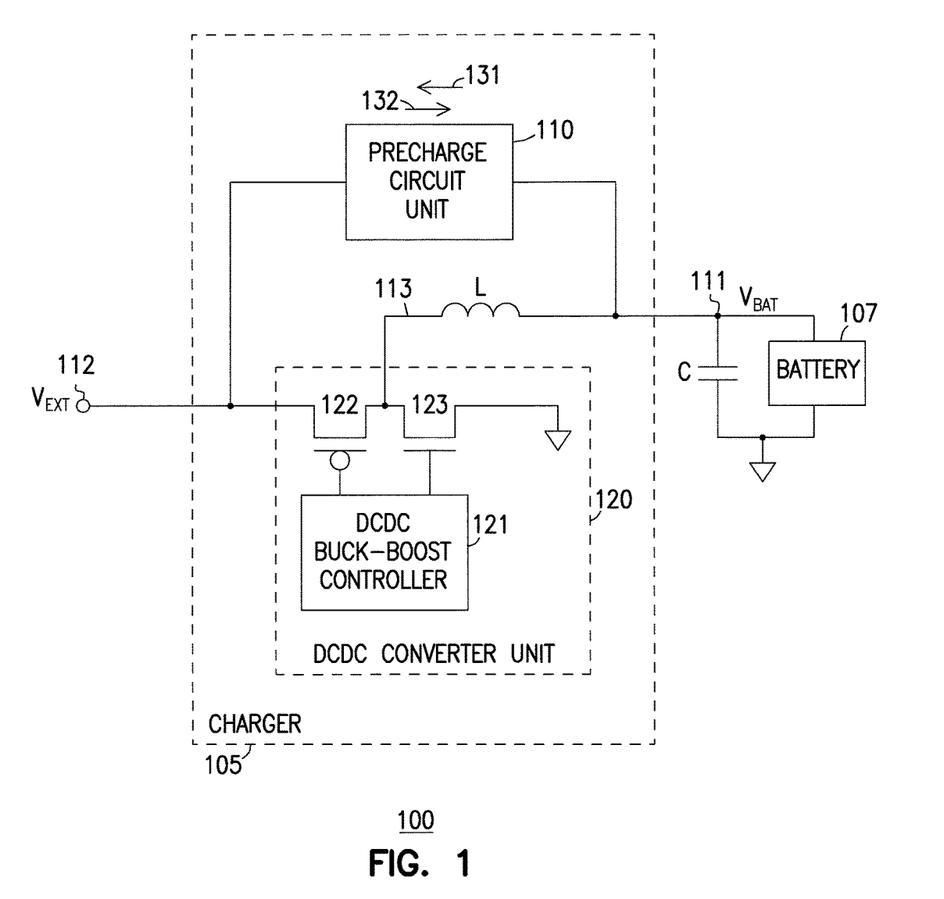
FIG. 1 shows an apparatus including a charger, which includes a precharge circuit unit and a DCDC (direct-current to direct-current) converter unit, according to some embodiments described herein.

FIG. 1 shows an apparatus 100 including a charger 105, which includes a precharge circuit unit 110 and a DCDC converter unit 120, according to some embodiments described herein. Apparatus 100 can also include a battery 107 and a capacitor C coupled to charger 105 at a node 111. Apparatus 100 can include or be included in electronic devices and systems, such as computers, tablets, cellular phones, and other electronic devices or systems. Precharge circuit unit 110 and a DCDC converter unit 120 can be located on (e.g., formed in or formed on) the same integrated circuit (IC) chip (e.g., a semiconductor chip).

As shown in FIG. 1, charger 105 can include a node 112. Node 112 can be part of (or can be coupled to) a power terminal of an interface (e.g., a connector). For example, charger 105 can be coupled to a USB connector (not shown) such that node 112 can be part of (or coupled to) a power terminal (e.g., Vcc pin) of the USB connector. USB connector is used as an example. Node 112 can be configured to couple to other types of interfaces that can support wired or wireless communication.

Charger 105 can include other components that are omitted from FIG. 1 in order not to obscure the embodiments described herein.

Charger 105 can be configured to operate in different modes at different times. In one mode (e.g., a supply mode), charger 105 can operate to provide charge (e.g., to cause current to flow) from node 111 to node 112. In the supply mode, DCDC converter unit 120 can operate as a DCDC boost converter (e.g., operating in a boost stage) to provide power (e.g., charge from battery 107) from node 111 to a load (e.g., an external device) coupled to node 112. In another mode (e.g., a charge mode), charger 105 can operate to provide charge from node 112 to node 111. In the charge mode, DCDC converter unit 120 can operate as a DCDC buck converter (e.g., operating in a buck stage) to provide charge from node 112 (e.g., from a power source coupled to node 112) to node 111 in order to charge battery 107.

Node 111 can have a voltage $V_{BAT}$. Node 112 can have a voltage $V_{EXT}$. Charger 105 can be configured such that it can be in the supply mode if a device (e.g., a USB device, a memory stick, or other devices) is coupled to node 112. Charger 105 can be configured such that it can be in the charge mode if a power source is coupled to node 112 (e.g., coupled to node 112 through an alternating-current to direct-current (ACDC) adapter).

As shown in FIG. 1, DCDC converter unit 120 can include a DCDC buck-boost controller 121, switches (e.g., power transistors) 122 and 123, and an inductor L coupled between node 111 and a node 113. Switch 122 can include a field effect transistor (FET), such as a p-channel metal-oxide semiconductor (PMOS) transistor. Switch 123 can include an n-channel metal-oxide semiconductor (NMOS) transistor. Inductor L can be located on a circuit board of a device or system that includes charger 105.

In FIG. 1, DCDC buck-boost controller 121 can operate to control (e.g., turn on or turn off) switches 122 and 123 in order to control the charging and discharging cycles of inductor L during different modes (e.g., supply charge and charge mode). For example, in a supply mode, DCDC buck-boost controller 121 can operate in a boost stage and control the switching of switches 122 and 123, such that charge can be provided from node 111 to node 112. In the charge mode, DCDC buck-boost controller 121 can operate in a buck stage and control the switching of switches 122 and 123, such that charge can be provided from node 111 to node 112.

Precharge circuit unit 110 can operate as a bi-directional current source between nodes 111 and 112. Thus, precharge circuit unit 110 is bi-directional precharge circuit unit, such that it can generate current and cause current to flow in opposite directions at different times. For example, in the supply mode of charger 105 (described above), precharge circuit unit 110 can operate to cause current to flow in a direction 132 from node 112 to node 111 in order to provide charge from node 111 to node 112 (e.g., when the value of voltage $V_{BAT}$ is higher than the value of voltage $V_{EXT}$). In another example, in the charge mode of charger 105 (described above), precharge circuit unit 110 can operate to cause current to flow in a direction 132 from node 112 to node 111 (e.g., when the value of voltage $V_{EXT}$ is higher than the value of voltage $V_{BAT}$).

As shown in FIG. 1, precharge circuit unit 110 can be coupled in parallel with DCDC converter unit 120 between nodes 111 and 112. Precharge circuit unit 110 can be configured such that it can operate to assist DCDC converter unit 120 in each of the modes (e.g., supply mode and charge mode) of charger 105, as described above. During an initial phase (e.g., at the beginning) of a particular mode of charger 105, precharge circuit unit 110 can cause charge to be provided from node 111 to node 112 (e.g., if the particular mode is the supply mode) or from node 112 to node 111 (e.g., if the particular mode is the charge mode). During the initial phase, switches 122 and 123 can be disabled (e.g., turned off). Thus, during the initial phase of each of the modes of charger 105, precharge circuit unit 110 can cause charge to be provided from node 111 to node 112 or from node 112 to node 111 through precharge circuit unit 110, bypassing DCDC converter unit 120. Bypassing means that charge can be provided through precharge circuit unit 110 and not through DCDC converter unit 120 during the initial phase of each of the supply mode and the charge mode. Thus, during the initial phase of each of the supply mode and the charge mode, precharge circuit unit 110 can cause charge to be provided from node 111 to node 112 or from node 112 to node 111, without the involvement of DCDC converter unit 120. Precharge circuit unit 110 may not be enabled during the entire time of the operation of charger 105 in each of the modes of charger 105. Precharge circuit unit 110 may be enabled during the initial phase (e.g., enabled only during a portion) of the operation of charger 105 in a particular mode. After the initial phase, precharge circuit unit 110 can be disabled (e.g., deactivated or turned off).

During the initial phase, DCDC converter unit 120 can be disabled (e.g., turned off). Then, DCDC converter unit 120 can be enabled (e.g., turned on) to take over the operation in the next phase (after initial phase) and continue to the operation in that particular mode. In the next phase, DCDC converter unit 120 can continue to cause charge to be provided from node 111 to node 112 (or from node 112 to node 111) through DCDC converter unit 120 (and not through precharge circuit unit 110).

Including precharge circuit unit 110 in charger 105 may help avoid power loss associated with DCDC converter unit 120 (because DCDC converter unit 120 can be disabled during an initial phase of the operation of charger 105). Including precharge circuit unit 110 in charger 105 may help protect components of DCDC converter unit 120 from stress conditions. For example, the difference between voltages $V_{BAT}$ and $V_{EXT}$ at a particular time can be 5V to 6V (when battery 107 is almost or completely discharged). This relatively large voltage difference may put stress on components (e.g., switches 122 and 123 of DCDC converter unit 120) if it (instead of precharge circuit unit 110) performs the charge delivery during the initial phase of the operation of charger 105. By using precharge circuit unit 110 (instead of DCDC converter unit 120) to perform the initial phase of the operation of charger 105, the voltage difference may be reduced to a relatively small value (e.g., 100 mV) at the end of the initial phase. Thus, when DCDC converter unit 120 takes over the operation in the next phase after the initial phase, the voltage difference between nodes 111 and 112 can be relatively small. This may help protect components (e.g., switches 122 and 123) from stress conditions. Other improvements and benefits of charger 105 are described below.

Figure 2:
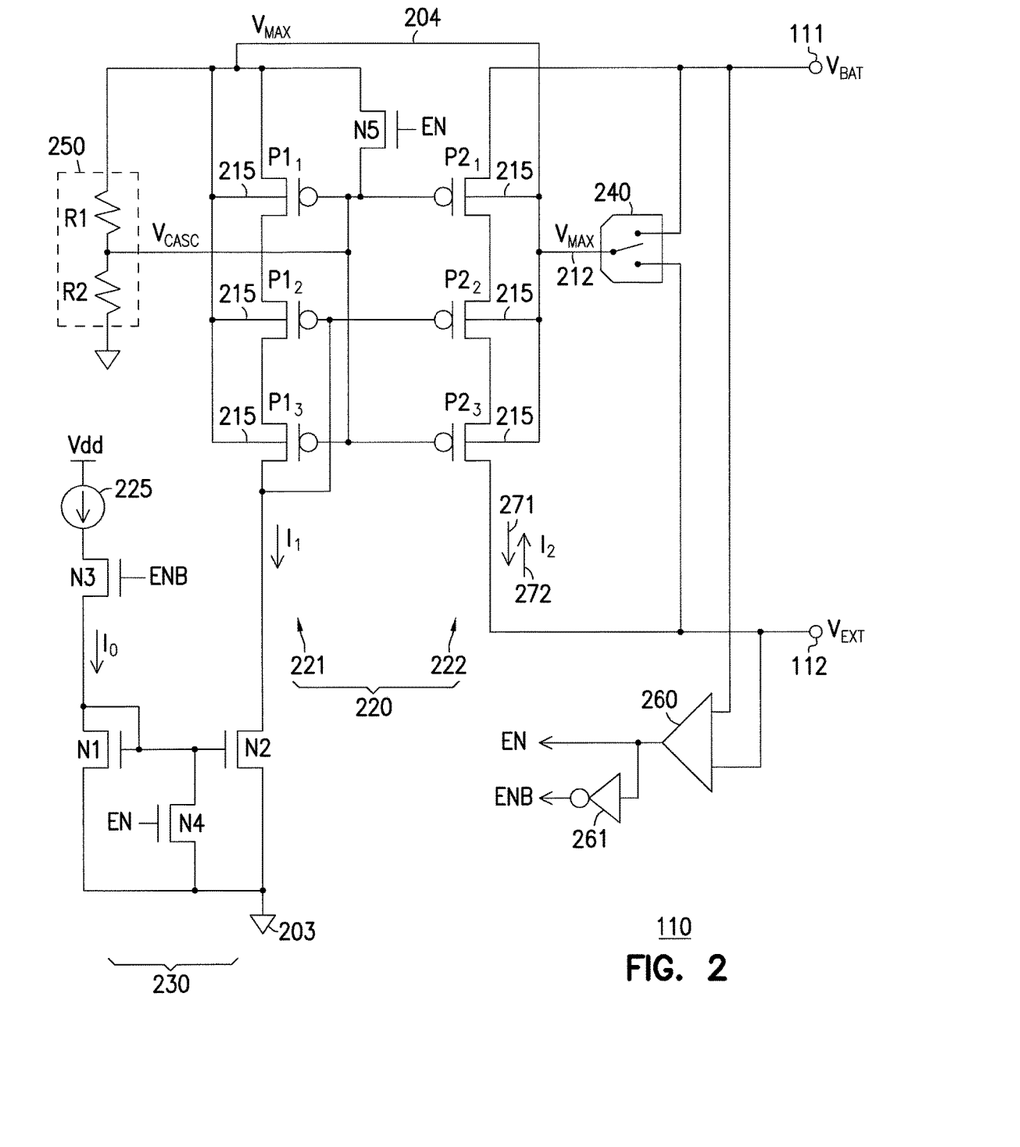
FIG. 2 shows a schematic diagram of the precharge circuit unit of FIG. 1, according to some embodiments described herein.

FIG. 2 shows a schematic diagram of precharge circuit unit 110 of FIG. 1, according to some embodiments described herein. Nodes 111 and 112 in FIG. 2 may be the same as those shown in FIG. 1. As shown in FIG. 2, precharge circuit unit 110 can include a current mirror circuit 220 (which can include circuit branches 221 and 222), a current mirror circuit 230, a selector (e.g., voltage selector) 240, a voltage generator (e.g., bias voltage generator) 250, and comparator circuit including a comparator 260 and an inverter 261.

Current mirror circuit 230 can operate to mirror a current $I_0$ from a source 225 (e.g., an auxiliary reference current source coupled to a voltage Vdd) to generate a current $I_1$. Current mirror circuit 220 can operate to mirror current $I_1$ to generate a current $I_2$. Current $I_2$ can flow in either direction 271 or 272 at a particular time, depending on the mode (e.g., supply mode or charge mode) that charger 105 (FIG. 1) operates at that particular time. Directions 271 and 272 can correspond to directions 131 and 132, respectively of FIG. 1. For example, in FIG. 2, current $I_2$ can flow in direction 271 from node 111 to node 112 to provide charge from node 111 to node 112 (to provide power from battery 107 (FIG. 1) to a device (e.g., a USB device) coupled to node 112. Current $I_2$ can flow in direction 272 (from node 112 to node 111) to provide charge from node 112 to node 111 (e.g., to charge battery 107 in FIG. 1 from a power source coupled to node 112).

In FIG. 2, selector 240 can include input nodes coupled to nodes 111 and 112 and can operate to select either voltage $V_{BAT}$ or $V_{EXT}$, whichever has a higher voltage value, to be a voltage $V_{MAX}$ at node 212. Node 212 can be an output node of selector 240. Selector 240 can form a supply voltage path 204 between node 212 (which is coupled to circuit branch 221) and one of nodes 111 and 112, whichever node has a higher voltage value at that time. For example, if the value of voltage $V_{BAT}$ at node 111 is higher than the value of voltage $V_{EXT}$ at node 112, then selector 240 can form supply voltage path 204 between node 111 and node 212 (and not form supply voltage path between node 112 and node 212). In another example, if the value of voltage $V_{EXT}$ at node 112 is higher than the value of voltage $V_{BAT}$ at node 111, then selector 240 can form supply voltage path 204 between node 112 and node 212 (and not form supply voltage path between node 111 and node 212). Thus, $V_{MAX}=V_{BAT}$ if $V_{BAT}>V_{EXT}$; and $V_{MAX}=V_{EXT}$ if $V_{EXT}>V_{BAT}$. Voltage $V_{MAX}$ can be used as a supply voltage for some of the transistors (described below) of current mirror circuit 220.

Voltage generator 250 can operate to generate a voltage $V_{CASC}$ from voltage $V_{MAX}$ and control (e.g., bias) the gates of some of the transistors of current mirror circuit 220 with voltage $V_{CASC}$. Voltage $V_{CASC}$ can have a value lower than (e.g., approximately one-half of) the value of voltage $V_{MAX}$. Using voltage $V_{MAX}$ based on the higher value between the values of voltages $V_{BAT}$ and $V_{EXT}$ is part of the operation of precharge circuit unit 110 that allows it to cause current $I_2$ to flow in either direction 271 or 272.

Comparator 260 can operate to generate a signal EN to disable precharge circuit unit 110 (e.g., to stop the generation of currents $I_1$ and $I_2$). As described above with reference to FIG. 1, precharge circuit unit 110 can operate to assist DCDC converter unit 120 during an initial phase of the supply mode (to move charge from node 111 to node 112) or the charge mode (move charge from node 112 to node 111). In FIG. 2, comparator 260 can operate to generate (e.g., activate) signal EN based on the difference (e.g., a delta) between the values of voltages $V_{BAT}$ and $V_{EXT}$. For example, comparator 260 can be configured such that if the difference between the values of voltages $V_{BAT}$ and $V_{EXT}$ reaches a predetermined value (e.g., 100 mV or another relatively small value), then comparator 260 can cause signal EN to change from one level to another level (and signal ENB can change its level the opposite way) to disable precharge circuit unit 110. Either signal EN or ENB can be provided to DCDC converter unit 120 (FIG. 1) to enable DCDC converter unit 120 (e.g., enable it in the next phase after the initial phase) when precharge circuit unit 110 is disabled. This allows DCDC converter unit 120 to take over and continue the operation to cause charge to be provided from 111 to 112 (or from node 112 to node 111) through DCDC converter unit 120 (and not through precharge circuit unit 110).

As shown in FIG. 2, precharge circuit unit 110 can include transistors $P1_1$, $P1_2$, $P1_3$, and N2 (which can be part of circuit branch 221), transistors $P2_1$, $P2_2$, and $P2_3$ (which can be part of circuit branch 222), and transistors N2, N3, N4, and N5, and resistors R1 and R2. Transistors N1 and N2 can be part of a current mirror circuit 230. Transistors N3, N4, and N5 can be part of a circuit that can operate to disable precharge circuit unit 110 at a particular time based on signals EN and ENB. Resistors R1 and R2 can be part of voltage generator 250. Resistors R1 and R2 can be embedded resistors (e.g., on-chip resistors).

Each of transistors $P1_1$, $P1_2$, $P1_3$, $P2_1$, $P2_2$, and $P2_3$ can include a FET, such as a PMOS transistor. Each of transistors N1 through N5 can include a FET, such as an NMOS transistor. Each of transistors $P1_1$, $P1_2$, $P1_3$, $P2_1$, $P2_2$, and $P2_3$ can have a voltage rating (voltage tolerance) less than the maximum value of the voltages at nodes 111 and 112. For example, each of transistors $P1_1$, $P1_2$, $P1_3$, $P2_1$, $P2_2$, and $P2_3$ can have a voltage rating of 3.3V and each of voltages $V_{BAT}$ and $V_{EXT}$ can have a maximum value in the range from 5V to 6V. These voltage values are used as an example. Other voltages may be used.

As shown in FIG. 2, node 212 can be coupled to the body (e.g., an N-well) 215 of transistors $P1_1$, $P1_2$, $P1_3$, $P2_1$, $P2_2$, and $P2_3$. Thus, voltage $V_{MAX}$ at node 212 can be provided to the body of transistors $P1_1$, $P1_2$, $P1_3$, $P2_1$, $P2_2$, and $P2_3$. Voltage $V_{MAX}$ can be used as supply voltage of the transistors $P1_1$, $P1_2$, and $P1_3$ of circuit branch 221. Providing voltage $V_{MAX}$ as a supply voltage of transistors $P1_1$, $P1_2$, and $P1_3$, and providing voltage $V_{MAX}$ to body 215 of transistors $P1_1$, $P1_2$, $P1_3$, $P2_1$, $P2_2$, and $P2_3$ may prevent potential leakage through the body diodes that may occur in transistors $P1_1$, $P1_2$, $P1_3$, $P2_1$, $P2_2$, and $P2_3$. This also ensures that current $I_1$ in circuit branch 221 always flows to ground from the higher voltage between voltages $V_{MAX}$ and $V_{EXT}$.

The value of current (e.g., charge) provided from node 111 to node 112 (or from node 112 to node 111) can be set by the value of current $I_0$. As mentioned above, current $I_0$ can be used (e.g., mirrored) to generate current $I_2$. The value of current $I_2$ can be based on the ratio (e.g., sizes) of the transistors on circuit branches 221 and 222. For example, if the ratio of transistor $P2_2$ over transistor $P1_2$ is n (a number greater than one), then the value of current $I_2$ can be n times the value of current $I_1$.

In operation, current $I_2$ can flow in direction 271 from node 111 to node 112 when charger 105 (FIG. 1) operates in the supply mode (e.g., DCDC converter unit 120 operates in a boost stage) to provide charge from node 111 node 112. In this mode, transistors $P1_3$ and $P2_3$ can operate as cascode devices; and transistors $P1_1$ and $P2_1$ can operate in deep linear region as pass devices (e.g., pass switches) with minimal voltage drop across them. Current $I_2$ can flow in direction 272 from node 112 to node 111 when charger 105 (FIG. 1) operates in the charge mode (e.g., DCDC converter unit 120 operates in a buck stage) to provide charge from node 112 node 111 (e.g., to charge battery 107). In this mode, transistors $P1_3$ and $P2_3$ can operate as cascade devices to protect precharge circuit unit 110.

Circuit branch 221 can be coupled to supply voltage path 204 (which is coupled to node 212) and a ground connection 203 to operate as a primary circuit branch of current mirror circuit 220. Circuit branch 222 can be coupled to nodes 111 and 112 to operate as a secondary primary circuit branch of current mirror circuit 220. Using voltage $V_{MAX}$ as a supply voltage for transistors $P1_1$, $P1_2$, and $P1_3$ of circuit branch 221 of current mirror circuit 220 allows precharge circuit unit 110 to operate such that current $I_2$ from current mirror circuit 220 can be provided from the node (either node 111 or 112) that has a higher voltage value to the node (111 or 112) that has a lower voltage value. Using voltage $V_{MAX}$ together with the arrangement (e.g., circuit connections) of circuit branches 221 and 222 may allow a flexible configuration of the precharge circuit unit 110 in order to support the bi-directional operation using the same circuit (e.g., precharge circuit unit 110), as described above.

In each mode (e.g., supply mode or charge mode) of charger 105 (FIG. 1), transistors $P1_2$ and $P2_2$, can operate as the main components of current mirror circuit 220 to determine the amount of current provided by precharge circuit unit 110. Transistors $P1_1$, $P2_1$, $P1_3$, and $P2_3$ can operate as cascading devices configured to cascade transistors $P1_2$ and $P2_2$, independent of the direction of current $I_2$. Transistors $P1_1$, $P2_1$, $P1_3$, and $P2_3$ can be biased with voltage $V_{CASC}$ at their gates. The operations of transistors $P1_1$, $P2_1$, $P1_3$, and $P2_3$ allow transistors $P1_2$ and $P2_2$ to operate in Safe Operating Area (SOA). For example, the value (e.g., 5V) of voltage $V_{MAX}$ (which is one of voltages $V_{BAT}$ and $V_{EXT}$) can be higher than the voltage rating (e.g., 3.3V) of each of transistors $P1_1$, $P1_2$, $P1_3$, $P2_1$, $P2_2$, and $P2_3$. Without transistors $P1_1$, $P1_3$, $P2_1$, and $P2_3$ being arranged as shown in FIG. 2, transistors $P1_2$ and $P2_2$ (the main components of current mirror circuit 220) may be unable to handle the higher voltage, leading to damage to transistors $P1_2$ and $P2_2$. Arranging transistors $P1_1$, $P1_2$, $P1_3$, $P2_1$, $P2_2$, and $P2_3$ as shown in FIG. 2 may protect transistors $P1_2$ and $P2_2$ from such damage. It allows the use of transistors having a voltage rating less than the maximum value of the voltage at nodes 111 and 112.

Further, as shown in FIG. 2, precharge circuit unit 110 may operate such that a current direction (e.g., direction 271 or 272) at a particular time can be selected (e.g., automatically selected) without using a dedicated control signal to indicate and select which direction current flows. This may help reduce control complexity and circuit area in precharge circuit unit 110.

Thus, as described above, precharge circuit unit 110 can operate during an initial phase of an operation of charger 105 during a particular time in order to provide charge from node 111 to node 112 or from node 112 to node 111, depending on the mode of charger 105 at that particular time. DCDC converter unit 120 can be disabled during the initial phase and enabled after the initial phase. Improvements and benefits of precharge circuit unit 110 are also described above.

Figure 3:
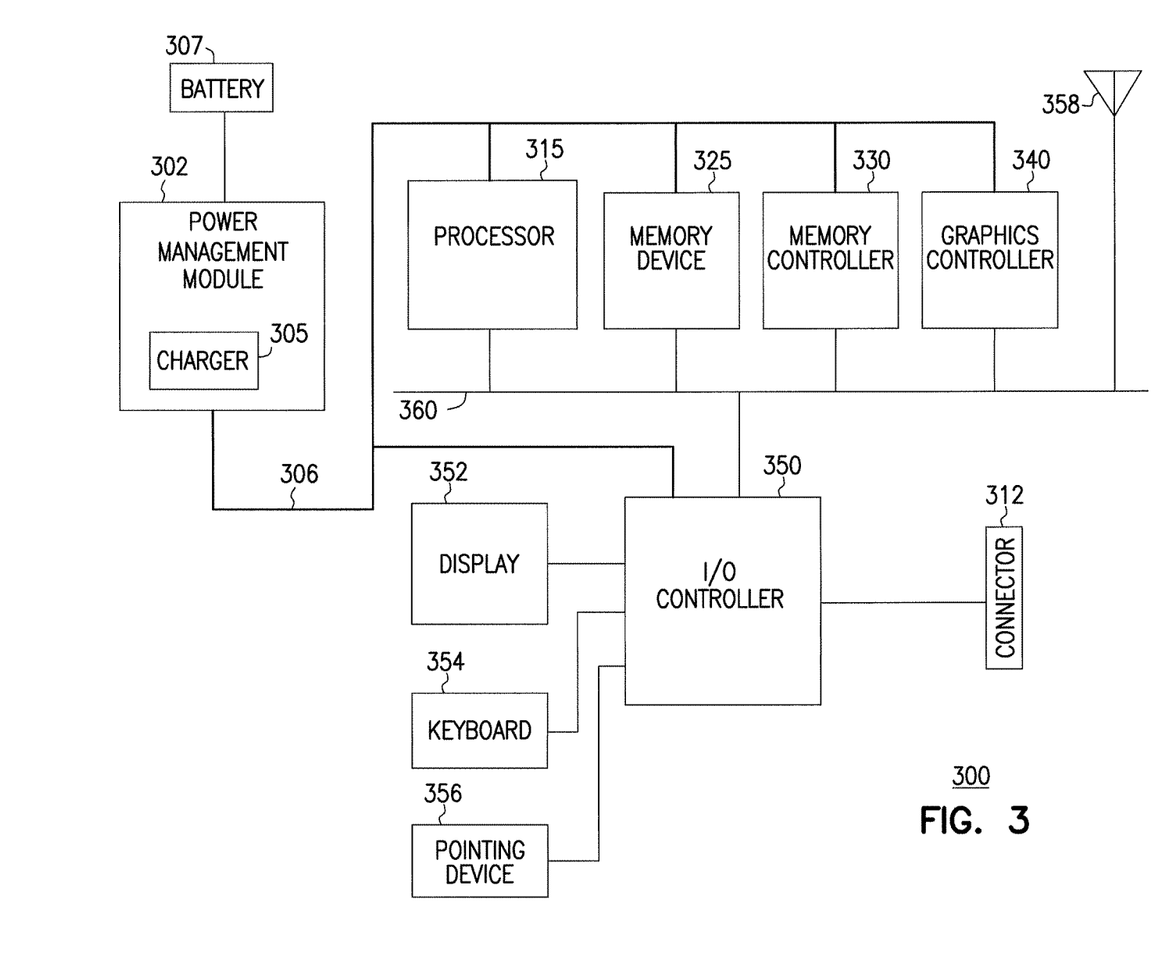
FIG. 3 shows an apparatus in the form of an electronic system, according to some embodiments described herein.

FIG. 3 shows an apparatus in the form of a system (e.g., electronic system) 300, according to some embodiments described herein. System 300 can include or be included in a computer, a tablet, wearable electronic things (e.g., smart watches), and other electronic systems. As shown in FIG. 3, system 300 can include components, such as a processor 315, a memory device 325, a memory controller 330, a graphics controller 340, an input and output (I/O) controller 350, a display 352, a keyboard 354, a pointing device 356, at least one antenna 358, a connector 312, and a bus 360. Bus 360 can include conductive lines (e.g., metal-based traces on a circuit board where the components of system 300 are located).

System 300 can also include a power management module 302 to manage and provide power to other components of system 300 through power delivery paths 306. Power management module 302 can include a charger 305. Charger 305 can include charger 105 described above with reference to FIG. 1 and FIG. 2.

Power management module 302 can provide power to other components from a battery 307. In FIG. 3, each of processor 315, memory device 325, memory controller 330, graphics controller 340, and I/O controller 350 can include an IC chip. Processor 315 can include a general-purpose processor or an application specific integrated circuit (ASIC). Processor 315 can include a central processing unit (CPU). Memory device 325 can include a dynamic random access memory (DRAM) device, a static random access memory (SRAM) device, a flash memory device, phase change memory, a combination of these memory devices, or other types of memory. FIG. 3 shows an example where memory device 325 is a stand-alone memory device separated from processor 315. In an alternative arrangement, memory device 325 and processor 315 can be located on the same die. In such an alternative arrangement, memory device 325 is an embedded memory in processor 315, such as embedded DRAM (eDRAM), embedded SRAM (eSRAM), embedded flash memory, or another type of embedded memory.

Display 352 can include a liquid crystal display (LCD), a touchscreen (e.g., capacitive or resistive touchscreen), or another type of display. Pointing device 356 can include a mouse, a stylus, or another type of pointing device.

In some arrangements, system 300 does not have to include a display. Thus, display 352 can be omitted from system 300. In some arrangements, system 300 does not have to include an antenna. Thus, antenna 358 can be omitted from system 300.

I/O controller 350 can include a communication module for wired or wireless communication (e.g., communication through one or more antennas 358). Such wireless communication may include communication in accordance with WiFi communication technique, Long Term Evolution Advanced (LTE-A) communication technique, or other communication techniques.

I/O controller 350 can also include a module to allow system 300 to communicate with other devices or systems in accordance with one or more standards or specifications (e.g., I/O standards or specifications), including USB, DisplayPort (DP), High-Definition Multimedia Interface (HDMI), Thunderbolt, Peripheral Component Interconnect Express (PCIe), and other specifications.

Connector 312 can be arranged (e.g., can include terminals, such as pins) to allow system 300 to be coupled to an external device (or system). This may allow system 300 to communicate (e.g., exchange information) with such a device (or system) through connector 312. Connector 312 can include or can be coupled to a node of system 300 in which such a node can correspond to node 112 of FIG. 1 and FIG. 2. In FIG. 3, connector 312 and at least a portion of bus 360 can include conductive lines that conform with at least one of USB, DP, HDMI, Thunderbolt, PCIe, and other specifications.

FIG. 3 shows the components of system 300 arranged separately from each other as an example. For example, each of processor 315, memory device 325, memory controller 330, graphics controller 340, and I/O controller 350 can be located on a separate IC (e.g., semiconductor die or IC chip). In some arrangements, two or more components (e.g., processor 315, memory device 325, graphics controller 340, and I/O controller 350) of system 300 can be located on the same die (e.g., same IC chip) that forms a system-on-chip (SoC) or located on the same IC package that forms a system-on-package (SoP) or system-in-package (SiP).

FIG. 3 shows an example number of the components of system 300. However, system 300 may include fewer or more components relative to the components shown in FIG. 3.

Figure 4:
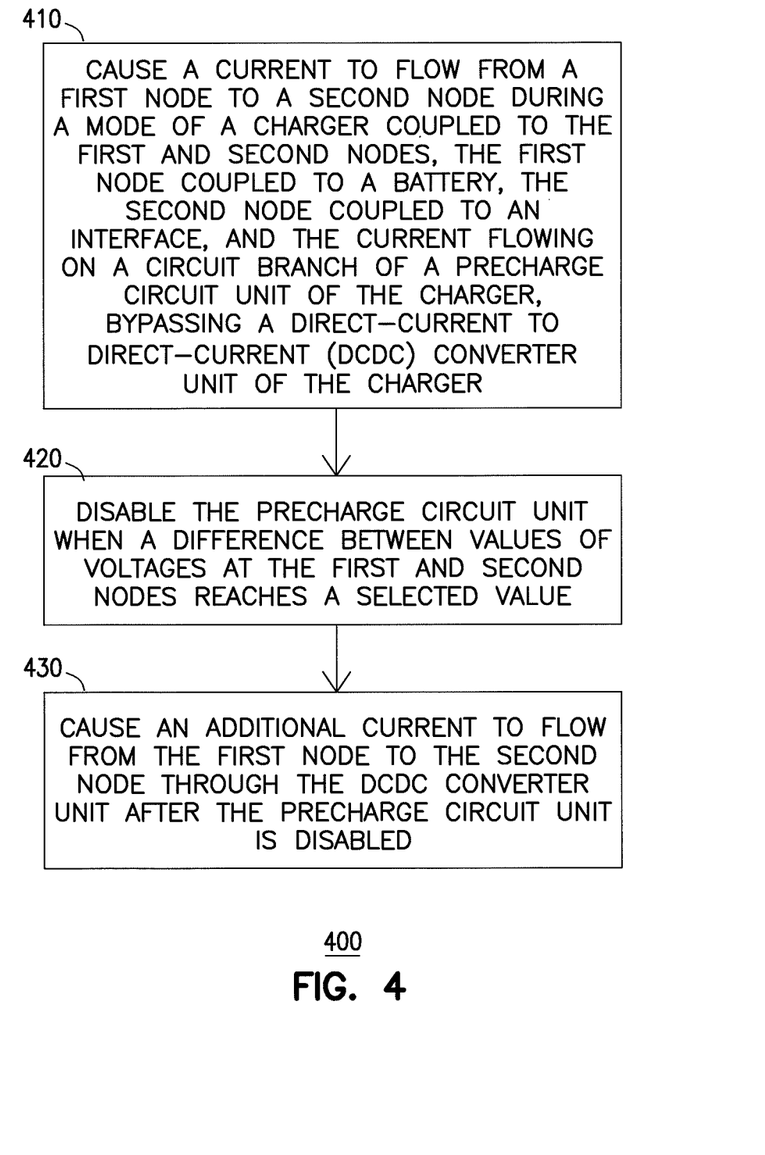
FIG. 4 is a flowchart showing a method of operating an electronic apparatus, according to some embodiments described herein.

FIG. 4 is a flowchart showing a method 400 of operating an electronic apparatus, according to some embodiments described herein. The electronic apparatus used in method 400 can include any of the apparatuses (apparatus 100 and system 300, and their components including charger 105, precharge circuit unit 110, and DCDC converter unit 120) described above with reference to FIG. 1 through FIG. 3. Some of the activities in method 400 may be performed by hardware, software, firmware, or any combination of hardware, software, and firmware. Such hardware, software, and firmware can be part of the electronic apparatus used in method 400.

As shown in FIG. 4, activity 410 of method 400 can include causing a current to flow from a first node to a second node during a mode of a charger coupled to the first and second nodes, the first node coupled to a battery, the second node coupled to an interface, and the current flowing on a circuit branch of a precharge circuit unit of the charger, bypassing a DCDC converter unit of the charger. Activity 420 can include disabling the precharge circuit unit when a difference between values of voltages at the first and second nodes reaches a selected value. Activity 430 can include causing an additional current to flow from the first node to the second node through the DCDC converter unit after the precharge circuit unit is disabled.

Method 400 can include fewer or more activities relative to activities 410, 420, and 430 in FIG. 4. For example, method 400 can include activities and operations of apparatus 100 and system 300, and their components including charger 105, precharge circuit unit 110, and DCDC converter unit 120, described above with reference to FIG. 1 through FIG. 3.

The illustrations of the apparatuses (e.g., apparatus 100 and system 300, and their components including charger 105, precharge circuit unit 110, and DCDC converter unit 120) and methods (e.g., method 400 and operations of apparatus 100 and system 300, and their components including charger 105, precharge circuit unit 110, and DCDC converter unit 120) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor modules or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), wearable electronic things (e.g., smart watches), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

ADDITIONAL NOTES AND EXAMPLES

Example 1 includes subject matter (such as a device, an electronic apparatus (e.g., circuit, electronic system, or both), or a machine) including a first node to couple to a battery, a second node to couple to a terminal of an interface, and a precharge circuit unit coupled to the first and second nodes to cause a first current to flow from the first node to the second node through a transistor of the precharge circuit unit based on first values of voltages at the first and second nodes and to cause a second current to flow from the second node to the first node through the transistor based on second values of voltages at the first and second nodes.

In Example 2, the subject matter of Example 1 may optionally include, wherein the precharge circuit unit includes a current mirror circuit, the current mirror circuit including a first circuit branch and a second circuit branch, the second circuit branch including the transistor.

In Example 3, the subject matter of Example 2 may optionally include, wherein the precharge circuit unit includes a selector to form a supply voltage path between the first circuit branch and one of the first and second nodes.

In Example 4, the subject matter of Example 3 may optionally include, wherein the transistor includes a body coupled to the supply voltage path.

In Example 5, the subject matter of Example 3 may optionally include, wherein the precharge circuit unit includes a voltage generator to generate a bias voltage based on a voltage on the supply voltage path.

In Example 6, the subject matter of Example 3 may optionally include, wherein the precharge circuit unit includes transistors having a voltage rating less than a maximum value of a voltage at the first node and a voltage at the second node.

In Example 7, the subject matter of any of Examples 1-6 may optionally include, wherein the precharge circuit unit includes circuitry to disable the precharge circuit unit based on a difference in values between voltages at the first and second nodes.

In Example 8, the subject matter of any of Examples 1-6 may optionally include, further comprising a direct-current to direct-current (DCDC) converter unit coupled to the first and second nodes to provide charge from the first node to the second node when the precharge circuit unit is disabled.

In Example 9, the subject matter of Example 8 may optionally include, wherein the DCDC converter unit is to provide charge from the second node to the first node when the precharge circuit unit is disabled.

Example 10 includes subject matter (such as a device, an electronic apparatus (e.g., circuit, electronic system, or both), or a machine) including a first node to couple to a battery, a second node to couple to a terminal of an interface, a selector including an output node, the selector to select a voltage from one of the first and second nodes to be a voltage at the output node of the selector, a current mirror including a first circuit branch and a second circuit branch, the first circuit branch coupled between the output node of the selector and a ground connection, the second circuit branch coupled between the first and second nodes, and a voltage generator coupled to the output node of the selector to provide a voltage to gates of transistors of the first circuit branch based on the voltage at the output node of the selector.

In Example 11, the subject matter of Example 10 may optionally include, wherein the current mirror is to cause a current to flow from the first node to the second node during one mode of the apparatus and to cause a current to flow from the second to the first node during another mode of the apparatus.

In Example 12, the subject matter of any of Examples 10 or 11 may optionally include, wherein the selector is to select a voltage at the first node to be the voltage at the output node of the selector if the voltage at the first node has a higher value than a voltage at the second node, and to select the voltage at the second node to be the voltage at the output node of the selector if the voltage at the second node has a higher value than the voltage at the first node.

In Example 13, the subject matter of any of Examples 10 or 11 may optionally include, wherein the first circuit branch includes first, second, and third transistors coupled between the output node of the selector and the ground connection.

In Example 14, the subject matter of Example 13 may optionally include, wherein the second current branch includes first, second, and third transistors coupled between the first and second nodes.

In Example 15, the subject matter of Example 14 may optionally include, wherein each of the first, second, and third transistors of each of the first and second circuit branches has a body coupled to the output node of the selector.

In Example 16, the subject matter of any of Examples 10 or 11 may optionally include, wherein the voltage generator includes a first resistor coupled between the output node of the selector and a gate of a transistor of the current mirror circuit, and a second resistor coupled between the gate of the transistor and the ground connection.

In Example 17, the subject matter of any of Examples 10 or 11 may optionally include, further comprising an additional current mirror coupled to the current mirror.

Example 18 includes subject matter (such as a device, an electronic apparatus (e.g., circuit, electronic system, or both), or a machine) including a first node coupled to a battery, a second node coupled to a universal serial bus (USB) connector, and a charger coupled to the battery and the USB connector, the charger including a precharge circuit unit coupled to the first and second nodes to cause a first current to flow from the first node to the second node through a transistor of the precharge circuit unit based on first values of voltages at the first and second nodes during a first mode of the charger and to cause a second current to flow from the second node to the first node through the transistor based on second values of voltages at the first and second nodes during a second mode of the charger.

In Example 19, the subject matter of Example 18 may optionally include, wherein the charger includes a direct-current to direct-current (DCDC) converter unit coupled to the first and second nodes, the DCDC converter unit to operate in a boost stage in the first mode and to operate in a buck stage in the second mode.

In Example 20, the subject matter of Example 18 or 19 may optionally include, wherein the precharge circuit unit includes a current mirror circuit, the current mirror circuit including a first circuit branch and a second circuit branch, the second circuit branch including the transistor.

In Example 21, the subject matter of Example 20 may optionally include, wherein the precharge circuit unit includes a selector to form a supply voltage path between the first circuit branch and one of the first and second nodes, and a voltage generator to generate a bias voltage based on a voltage on the supply voltage path.

Example 22 includes subject matter (such as a method of operating a device, an electronic apparatus (e.g., circuit, electronic system, or both), or a machine) including causing a current to flow from a first node to a second node during a mode of a charger coupled to the first and second nodes, the first node coupled to a battery, the second node coupled to an interface, and the current flowing on a circuit branch of a precharge circuit unit of the charger, bypassing a direct-current to direct-current (DCDC) converter unit of the charger, disabling the precharge circuit unit when a difference between values of voltages at the first and second nodes reaches a selected value, and causing an additional current to flow from the first node to the second node through the DCDC converter unit after the precharge circuit unit is disabled.

In Example 23, the subject matter of Example 22 may optionally include, wherein the DCDC converter unit operates in a boost stage during the mode of the charger.

In Example 24, the subject matter of Example 22 or 23 may optionally include, further comprising causing a current to flow from the second node to the first node during an additional mode of the charger, the current flowing on the circuit branch of the precharge circuit unit during the additional mode, bypassing the DCDC converter unit of the charger during the additional mode, disabling the precharge circuit unit when a difference in values between voltages at the first and second nodes during the additional mode reaches the selected value, and causing a current to flow from the second node to the first node through the DCDC converter unit after the precharge circuit unit is disabled in the additional mode.

In Example 25, the subject matter of Example 24 may optionally include, wherein the DCDC converter unit operates in a buck stage during the additional mode of the charger.

Example 26, includes subject matter (such as a device, an electronic apparatus (e.g., circuit, electronic system, or both), or machine) including means for performing any of the methods of claims 22-25.

The subject matter of Example 1 through Example 26 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. An apparatus comprising:
a first node to couple to a battery;
a second node to couple to a terminal of an interface;
a precharge circuit unit coupled to the first and second nodes to cause a first current to flow from the first node to the second node through a transistor of the precharge circuit unit based on first values of voltages at the first and second nodes and to cause a second current to flow from the second node to the first node through the transistor based on second values of voltages at the first and second nodes;
wherein the precharge circuit unit includes a selector to form a supply voltage path between the first circuit branch and one of the first and second nodes;
wherein the precharge circuit unit includes a current mirror circuit, the current mirror circuit including a first circuit branch and a second circuit branch, the second circuit branch including the transistor; and
wherein the precharge circuit unit includes transistors having a voltage rating less than a maximum value of a voltage at the first node and a voltage at the second node.

2. The apparatus of claim 1, wherein the transistor includes a body coupled to the supply voltage path.

3. The apparatus of claim 1, wherein the precharge circuit unit includes a voltage generator to generate a bias voltage based on a voltage on the supply voltage path.

4. The apparatus of claim 1, wherein the precharge circuit unit includes circuitry to disable the precharge circuit unit based on a difference in values between voltages at the first and second nodes.

5. The apparatus of claim 1, further comprising a direct-current to direct-current (DCDC) converter unit coupled to the first and second nodes to provide charge from the first node to the second node when the precharge circuit unit is disabled.

6. The apparatus of claim 5, wherein the DCDC converter unit is to provide charge from the second node to the first node when the precharge circuit unit is disabled.

7. An apparatus comprising:
a first node to couple to a battery;
a second node to couple to a terminal of an interface;
a selector including an output node, the selector to select a voltage from one of the first and second nodes to be a voltage at the output node of the selector;
a current mirror including a first circuit branch and a second circuit branch, the first circuit branch coupled between the output node of the selector and a ground connection, the second circuit branch coupled between the first and second nodes; and
a voltage generator coupled to the output node of the selector to provide a voltage to gates of transistors of the first circuit branch based on the voltage at the output node of the selector.

8. The apparatus of claim 7, wherein the current mirror is to cause a current to flow from the first node to the second node during one mode of the apparatus and to cause a current to flow from the second to the first node during another mode of the apparatus.

9. The apparatus of claim 7, wherein the selector is to select a voltage at the first node to be the voltage at the output node of the selector if the voltage at the first node has a higher value than a voltage at the second node, and to select the voltage at the second node to be the voltage at the output node of the selector if the voltage at the second node has a higher value than the voltage at the first node.

10. The apparatus of claim 7, wherein the first circuit branch includes first, second, and third transistors coupled between the output node of the selector and the ground connection.

11. The apparatus of claim 10, wherein the second current branch includes first, second, and third transistors coupled between the first and second nodes.

12. The apparatus of claim 11, wherein each of the first, second, and third transistors of each of the first and second circuit branches has a body coupled to the output node of the selector.

13. The apparatus of claim 7, wherein the voltage generator includes a first resistor coupled between the output node of the selector and a gate of a transistor of the current mirror circuit, and a second resistor coupled between the gate of the transistor and the ground connection.

14. The apparatus of claim 7, further comprising an additional current mirror coupled to the current mirror.

15. An apparatus comprising:
a first node coupled to a battery;
a second node coupled to a universal serial bus (USB) connector; and
a charger coupled to the battery and the USB connector, the charger including a precharge circuit unit coupled to the first and second nodes to cause a first current to flow from the first node to the second node through a transistor of the precharge circuit unit based on first values of voltages at the first and second nodes during a first mode of the charger and to cause a second current to flow from the second node to the first node through the transistor based on second values of voltages at the first and second nodes during a second mode of the charger.

16. The apparatus of claim 15, wherein the charger includes a direct-current to direct-current (DCDC) converter unit coupled to the first and second nodes, the DCDC converter unit to operate in a boost stage in the first mode and to operate in a buck stage in the second mode.

17. An apparatus comprising:
a first node coupled to a battery;
a second node coupled to a universal serial bus (USB) connector: and a charger coupled to the battery and the USB connector, the charger including a precharge circuit unit coupled to the first and second nodes to cause a first current to flow from the first node to the second node through a transistor of the precharge circuit unit based on first values of voltages at the first and second nodes during a first mode of the charger and to cause a second current to flow from the second node to the first node through the transistor based on second values of voltages at the first and second nodes during a second mode of the charger;
wherein the precharge circuit unit includes a current mirror circuit, the current mirror circuit including a first circuit branch and a second circuit branch, the second circuit branch including the transistor.

18. The apparatus of claim 17, wherein the precharge circuit unit includes a selector to form a supply voltage path between the first circuit branch and one of the first and second nodes, and a voltage generator to generate a bias voltage based on a voltage on the supply voltage path.

* * * * *